United States Patent [19]

Menzel et al.

[11] Patent Number: 5,190,583
[45] Date of Patent: Mar. 2, 1993

[54] AQUEOUS COATING COMPOSITION AND THE USE THEREOF FOR COATING TO BE PROTECTED FROM LIGHT, ESPECIALLY ULTRAVIOLET RADIATION

[75] Inventors: Tankred Menzel, Bad Essen; Hermann Nickel, Bohmte, both of Fed. Rep. of Germany

[73] Assignee: Transfer-Electric Gesellschaft Fur, Lemforde, Fed. Rep. of Germany

[21] Appl. No.: 902,793

[22] Filed: Jun. 24, 1992

Related U.S. Application Data

[63] Continuation of Ser. No. 444,877, Dec. 4, 1989, abandoned.

[51] Int. Cl.$^5$ ................................................ C08K 3/16
[52] U.S. Cl. .................................. 106/241; 106/401; 106/403; 106/407; 106/436; 106/447; 106/450; 106/453; 106/455; 106/460; 106/464; 106/465; 106/479; 106/482; 106/483; 106/499; 106/500; 106/903; 428/404; 428/407; 524/284
[58] Field of Search ............... 106/241, 401, 403, 407, 106/436, 447, 450, 453, 455, 460, 464, 465, 479, 482, 483, 499, 500, 903; 524/284; 428/404, 407

[56] References Cited

U.S. PATENT DOCUMENTS

| | | | |
|---|---|---|---|
| 3,437,503 | 4/1969 | Massam et al. | 106/241 |
| 3,458,804 | 7/1969 | Wolf et al. | 106/241 |
| 3,666,501 | 5/1972 | Barnett et al. | 106/241 |
| 3,879,335 | 4/1975 | Storck et al. | 106/241 |
| 3,998,652 | 12/1976 | Aign et al. | 106/499 |
| 4,001,035 | 1/1977 | Ito et al. | 106/241 |
| 4,260,424 | 4/1981 | Mizoguchi et al. | 106/500 |
| 4,810,305 | 3/1989 | Braun et al. | 106/499 |

FOREIGN PATENT DOCUMENTS 0401477 1/1967 Australia ........................ 106/499

*Primary Examiner*—William R. Dixon, Jr.
*Assistant Examiner*—Anthony J. Green
*Attorney, Agent, or Firm*—Larson and Taylor

[57] ABSTRACT

An aqueous coating composition is provided which reflects light, especially UV radiation, and can be colored as desired. It is prepared from a synthetic resin dispersion and inorganic pigments having a particle size ranging between 7 and 10 nm, with the exception of carbon black.

7 Claims, No Drawings

AQUEOUS COATING COMPOSITION AND THE USE THEREOF FOR COATING TO BE PROTECTED FROM LIGHT, ESPECIALLY ULTRAVIOLET RADIATION

This application is a continuation of application Ser. No. 07/444,877 filed Dec. 4, 1989 abandoned.

The present invention relates to an aqueous coating composition and the use thereof for coating articles which are to be protected from UV radiation.

From numerous publications it has become known that polyolefins, such as high pressure and low pressure polyethylene, polypropylenes and other synthetic resins, are highly prone to damage caused by UV radiation, because such radiation effects "photochemical decomposition". Such photochemical decomposition of synthetic resins causes losses on the order of about 100 million DM every year.

Furthermore, it has been known that carbon black pigments have the property of increasing the stability of synthetic resins towards the effects of ultraviolet radiation. Therefore, various synthetic resin processors recommend the admixture of 3 to 5% by weight of carbon black with the synthetic resin.

The addition of 3 to 5% by weight of carbon black to the synthetic resin composition has the purpose of absorbing incident UV radiation in order to thereby protect the synthetic resin against photochemical degradation. However, in practice it has become apparent that in countries of intensive solar radiation the synthetic resin degrades even if it has a carbon black content from 3 to 5% by weight incorporated therein. The reason for this phenomenon is the fact that UV radiation, being an electromagnetic wave, is converted to another form of energy only when it impinges against a carbon black pigment particle, i.e. the incident wave first penetrates the synthetic resin surface where it initiates chemical decomposition, before it impinges against a carbon black pigment particle.

Like the addition of carbon black, additions of UV radiation absorbent transparent iron oxides, or of UV radiation absorbent organic compounds have been used in order to protect the synthetic resins from degradation by UV radiation. The added quantities generally range from 1 to 4%, based on the synthetic resin or lacquer mixtures.

Finally, the use of a mixture of a 25 to 45% by weight aqueous channel black dispersion and a 45 to 55% by weight aqueous polyacrylate resin dispersion has been known wherein the ratio of channel black particle diameter to polyacrylate resin particle diameter is at best 1:20, and a sufficient quantity of black particles is present to fully cover the surface of all the polyacrylate resin particles, for coating articles that are to be protected from UV radiation. The coats obtained in this manner exhibit a black surface obviously consisting exclusively of carbon black particles and acting like a screen, thereby providing effective protection from UV radiation. However, aside from the black coloring, such an UV protecting coat has the disadvantage of absorbing not only any incident UV radiation but also the spectrum of infrared radiation in the wavelength range from 700 to 2000 nm, which inevitably results in heat developing in the coated articles. Consequently, it can be used only for applications where the black coloring is of no disadvantage, and where the absorption of heat is of no nuisance.

It is the object of the present invention to provide a coating composition which, on the one hand, can be dyed any desired color, and which, on the other hand, when applied to the articles to be protected against UV radiation, forms an external inorganic protective film that warrants complete reflection of radiation, particularly UV and IR reflection, and so prevents heating of said articles.

This object is realized according to the present invention with an aqueous coating composition consisting substantially of an aqueous synthetic resin dispersion and one or more inorganic pigments, with the exception of carbon black, having an average particle size of 7 to 70 nm, preferably 7 to 50 nm, especially 7 to 30 nm, wherein for one part by weight of said synthetic resin particles at least one part by weight of said pigment particles are used, the amount of said pigment particles being sufficient to provide U.V. protection upon coating.

All pigments having the above indicated particle sizes come into consideration as inorganic pigments, for example inorganic polyacids, metal oxides, mixed metal oxides, and inorganic salts. The pigments preferably used for the purpose of the invention include bright pigments, such as pyrogenic silica, precipitated silica, precipitated aluminum silicate, precipitated calcium silicate, and precipitated calcium carbonate and pyrogenically prepared other pigments, such as antimony-(III) oxide, chromium-(III) oxide, iron-(III) oxide, germanium-(IV) oxide, vanadium-(V) oxide, tungsten-(VI) oxide, titanium dioxide, and zirconium oxide. Pyrogenic and precipitated silicic acids are especially preferred.

Such silicic acid, especially the pyrogenic silicic acids, can be advantageously covered with metals, especially noble metals, and/or with metal compounds. Such metals or metal compounds include Ni, NiO, Ni-$(OH)_2$, Pt, Pd, $PdCl_2$, Ru, Rh, Ti compounds, $SnO_2$, $MoO_3$, and Fe.

The coating compositions prepared according to the invention with the use of bright pigments can be colored as desired by the addition of coliring pigments of a particle size in the same order of magnitude as that of the bright pigments. Such coloring pigments include, for example, the transparent iron oxides available on the market by the tradename "Sicotrans" and manufactured by BASF, and the "Vossen blau" pigments manufactured by Degussa. Both pigments have primary particle sizes in the millimicron range. According to the invention, from 3 to 10% of coloring pigment are added to the coating composition, depending on the desired color. In this way it is possible to color, for example, the white surfaces obtained with the use of pyrogenic or precipitated silica.

Of course, it is possible according to the present invention to replace, for special applications, all the bright pigment by colored pigment.

The silicic acids used according to the invention and obtained either by precipitation or pyrogenically, and also the metal oxides prepared by this method, e.g. alumina or mixed oxides, are offered by Degussa, for example by the tradename "Aerosil", or by Monsanto by the tradename "Syton", and are described, for example, in the brochures "Aerosil" and "Helle Verstärkerfüllstoffe" of Messrs, Degussa. Aerosil is a highly pure silica product which—as silicic acid—has a primary particle size of 7 to 40 nm, depending on the type—and a silicon content of 98 to 99.8% (see the Degussa publication series).

Aerosil is used, inter alia, in the paint and varnish industry as a thixotropic and dulling agent. For these applications (see Degussa brochures 21+33) 1 to 5% by weight of aerosil are recommended for the attainment of positive effects.

The use of silica as pigment for an UV protecting lacquer does not come into consideration, in principle, since the silica particles—similar to quartz glass—are completely pervious to radiation. The diffraction index of 1.45 corresponds to that of a dried synthetic resin dispersion film, so that there is complete transparency, and no optical influence of UV radiation and of visible light is noticeable.

Such transparency was observed also with mixed oxides of 99% $SiO_2$ and 1% $Al_2O_3$. Heretofore the prior art has not reported on any influence of UV radiation.

The individual $SiO_2$ pigments of 10 nm particle size, for example, range far below the wavelength of visible light of 500 nm, for example. Therefore, an individual $SiO_2$ pigment particle cannot be visible. The function in UV or infrared light is similar. Thus, even at a high pigment volume concentration the transparency of the lacquer films is retained. However, dulling effects or variations in gloss are detectable.

While even at very high degrees of filling the transparency was retained, it was surprisingly found that above certain high pigment volume concentrations a white inorganic film surface forms which is highly reflective with respect to light. This effect is invariably achieved according to the invention when the pigment volume concentration is so high that the radiation to be reflected meets the individual $SiO_2$ pigments particles in the form of a coherent homogeneous surface.

Although it has been known in the prior art to blend synthetic resin dispersions with pigments for use as lacquer in order to attain reflection effects, and for this purpose, for example, titanium dioxide, barium sulfate, lead oxide, mica, kaolin, chalk, talcum, or iron oxide have been used as pigments in order to achieve reflection properties, an analysis of the pigment particle size shows that the color pigment particles are frequently a thousand times larger than the synthetic resin globules of the synthetic resin dispersions present in the film-forming dispersion. As a result, UV radiation-susceptible synthetic resin is also present at the surface, and thus is susceptible to destruction by UV radiation.

The following demonstrates the difference between the prior art and the present invention.

While in conventional pigmented dispersion lacquers the colored pigment particles are large compared with the synthetic resin globules, the colored pigments used according to the present invention are of smaller particle size than the size of the synthetic resin particles. Incidentally, this applies only to aqueous dispersions, not to synthetic resin solutions, because the latter thicken substantially already upon the addition of very little aerosil. Yet, according to the present invention the aqueous synthetic resin dispersion can be replaced for special applications by dispersions wherein the synthetic resin particles are dispersed in organic liquids that do not substantially thicken upon the addition of aerosil.

The pigments used to prepare the coating composition of the invention are employed preferably in the form of aqueous dispersions containing from 30 to 55% by weight, preferably from 30 to 40% by weight, of pigment. The same applies to the synthetic resin dispersions which, however, contain preferably 45 to 55% by weight of synthetic resin particles. Preferably synthetic resin dispersions are selected wherein the synthetic resin globules have a particle size ranging between 0.1 and 0.5 $\mu$m, whereas the particle size of the pigments used according to the invention preferably ranges between 10 and 50 nm.

To coating compositions that are not to form highly elastic coatings a water glass solution consisting of silicate of potassion or of sodium may be added; in that case the quantity of water glass should not exceed 50% by weight of the $SiO_2$ dispersion.

The particles of the synthetic resin dispersion used according to the invention preferably consist of polyacrylate esters, polymethacrylate esters, and/or copolymers of acrylate esters and/or methacrylate esters with other vinyl monomers, or other monomers containing one or more C—C double bonds, or of heat-sealable carboxyl groups-containing polyvinylidene chlorides and/or copolymers thereof. Such dispersions are obtainable, for example, from BASF under the trademarks "Acronal", "Diofan", or "Lutofan" of which a wide variety of types is offered.

Besides the above mentioned components the coating composition according to the invention may, of course, contain adjuvants customary in dispersion dyes, e.g. for adjusting the spreading characteristics or dripping characteristics.

According to the invention preferably so much pigment particles are introduced into the synthetic resin dispersion that the surface of all the synthetic resin particles is thereby completely covered. Covering of the surface of the synthetic resin particles is the more complete, the smaller the pigment particles are relative to the size of the synthetic resin particles. Preferably the ratio of pigment particle diameter to synthetic resin particle diameter is equal to or less than 1:20, especially 1:100 or less. In other words—if, for example, the diameter of the pigment particles is only 1/100 or less of the diameter of the synthetic resin particles one obtains very good covering of the surface of the synthetic resin particles and, on the other hand, in the film-forming process a very dense pigment packing on the film surface. From the ratio of pigment particle diameter to synthetic resin particle diameter, and with a view to his object of obtaining a high density surface covering of synthetic resin particles the expert can find by simple calculations the quantitative proportions of the pigment dispersion that must be mixed with the synthetic resin dispersion.

The coating which is to offer protection against UV radiation is obtained by application of the coating composition of the invention on a substrate and evaporation of the liquid. While the coating dries the synthetic resin globules coalesce to form a film by plastic ally flowing into one another under the influence of the considerable cohesive force. The substantially smaller pigment particles are shifted aside or toward the surface where synthetic resin particles get in contact with one another. Also in places where the synthetic resin globules get in contact with the substrate surface to be coated the pigment particles are shoved aside so that the film firmly adheres to the substrate. When the coated surface is completely dry, the entire surface is covered with pigment. The pigment particles are firmly anchored to the substrate surface by way of the synthetic resin particles which combine to form a film. The film thickness should be about 100 μm. Under UV radiation the coating exhibits virtually 100% reflectivity.

With the coating composition according to the invention all articles can be coated that are to be protected from UV and/or abrasion. A special field of application is the coating of synthetic resin film. In several instances it may be advantageous to apply a bonding agent onto the article to be coated before coating it with the coating composition.

The radiation harmful to organic compounds ranges within wavelengths from 280 to 400 nm.

Although the coating according to the invention is reflective also in the so-called UVC range of wavelengths below 280 nm, the main field of application lies in the wavelength range from 290 to 600 nm since UV radiation of wavelengths less than 280 nm (UVC radiation) is captured by the ozone layer of the atmosphere.

UVB radiation ranges from 295 to 320 nm, UVA radiation ranges from 320 to 380 nm.

The following comparative examples and examples explain the preparation of the coating composition of the invention for producing UV-reflecting surface coatings. The coating composition is applied onto the articles to be protected from UV radiation by means of conventional techniques.

COMPARATIVE EXAMPLE 1

50 Parts by weight of a 40% by weight aqueous $SiO_2$ dispersion are prepared. Into said dispersion 100 parts by weight of a 50% by weight polyacrylate dispersion are added and stirred for about 15 minutes. After application and drying the resulting film is highly transparent and does not exhibit any reflection of UV light.

COMPARATIVE EXAMPLE 2

Into 100 parts by weight of an aqueous 40% by weight $SiO_2$ dispersion 150 parts by weight of a 50% by weight acrylic resin dispersion are stirred. After application and drying the film is completely transparent to UV and to visible light.

COMPARATIVE EXAMPLE 3

Into 100 parts by weight of a 40% by weight aqueous $SiO_2$ dispersion 100 parts by weight of a 50% by weight of an acrylic resin dispersion are stirred. After drying the film shows a slight loss of transparency, but almost no reflection of UV radiation.

EXAMPLE 1

125 parts by weight of a 40% by weight aqueous $SiO_2$ dispersion are prepared into which 100 parts by weight of a 50% by weight aqueous synthetic resin dispersion are stirred (15 minutes). After application and drying of the film a white, UV-reflecting coating has formed.

EXAMPLE 2

150 parts by weight of a 40% by weight aqueous $SiO_2$ dispersion are prepared into which 100 parts by weight of a 50% by weight aqueous synthetic resin dispersion are stirred (15 minutes). After application and drying of the film a white, UV-reflecting coating has formed.

A higher degree of filling deteriorates the mechanical strength data of the film.

What is claimed is:

1. An aqueous coating composition consisting essentially of a film-forming aqueous dispersion of synthetic resin particles and inorganic pigment particles, except carbon black, wherein
   (a) said pigment particles have an average particle size of 7 to 70 nm,
   (b) said synthetic resin particles have a greater particle size than the inorganic pigment particles and are completely coated with the inorganic pigment particles,
   (c) the proportions of synthetic resin particles to pigment particles being one part by weight of said synthetic resin particles to at least one part by weight of said pigment particles and said pigment particles being present in an amount sufficient to provide UV protection upon coating, and
   (d) said coating composition after applying to a surface and drying provides a coating with the inorganic pigment particles in the form of a coherent homogeneous surface that reflects UV radiation.

2. Coating composition according to claim 1, wherein the inorganic pigment particles are inorganic polyacids, metal oxides, mixed metal oxides, or inorganic salts prepared by pyrogenic processes or by precipitation reactions.

3. Coating composition according to claim 1, wherein the inorganic pigments consist of at least one compound selected from the group consisting of pyrogenic silicic acid, precipitated silicic acid, precipitated aluminum silicate, precipitated calcium silicate, precipitated calcium carbonate, antimony-(III) oxide, chromium-III oxide, iron-(III) oxide, titanium dioxide, germanium-(IV) oxide, vanadium-(V) oxide, tungsten-(VI) oxide and zirconium oxide.

4. Coating composition according to claim 3, wherein the pyrogenic silicic acid or the precipitated silicic acid are covered with metal.

5. Coating composition according to claim 1, wherein the synthetic resin particles are selected from the group consisting of polyacrylate esters, polymethacrylate esters, or copolymers of acrylate, and/or methacrylate esters with other vinyl monomers or other monomers having one or more C—C double bonds and mixtures thereof.

6. Coating composition according to claim 1, wherein the synthetic resin particles are selected from the group consisting of heat-sealable carboxyl groups-containing polyvinylidene chlorides and copolymers thereof.

7. A coating composition according to claim 4 wherein the pyrogenic silicic acid is covered with a noble metal.

* * * * *